No. 873,263. PATENTED DEC. 10, 1907.
W. A. PARIS.
ELECTRIC CIRCUIT CONTROLLER.
APPLICATION FILED MAR. 3, 1906.
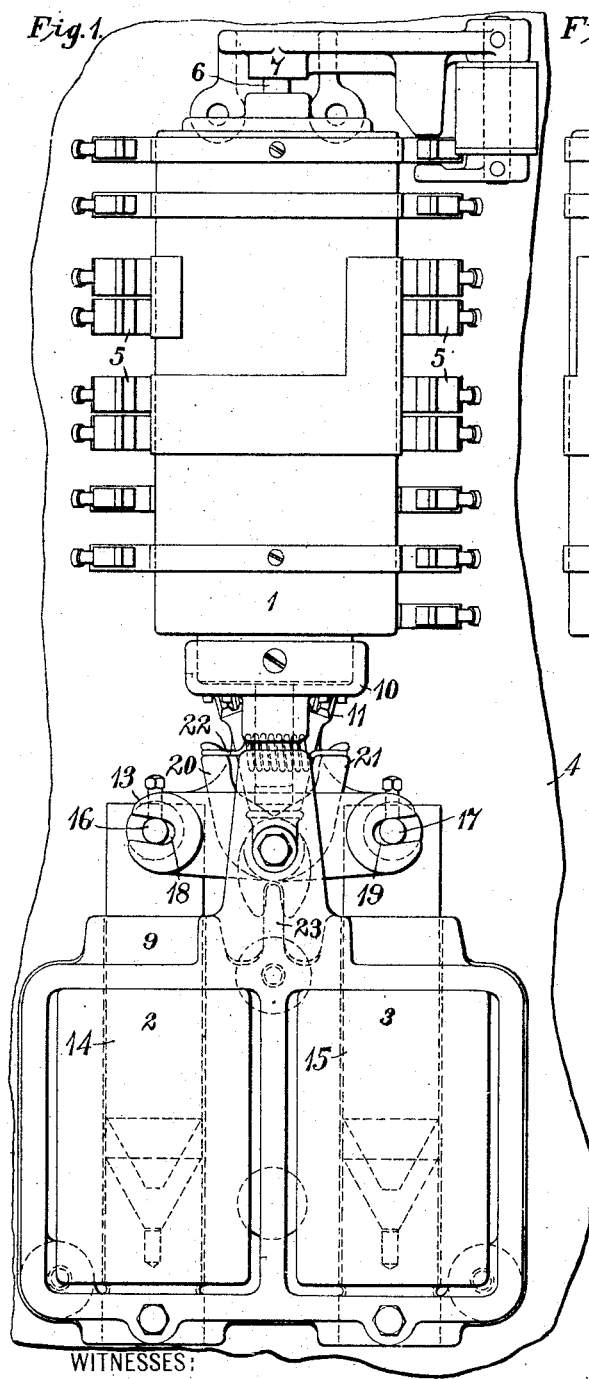
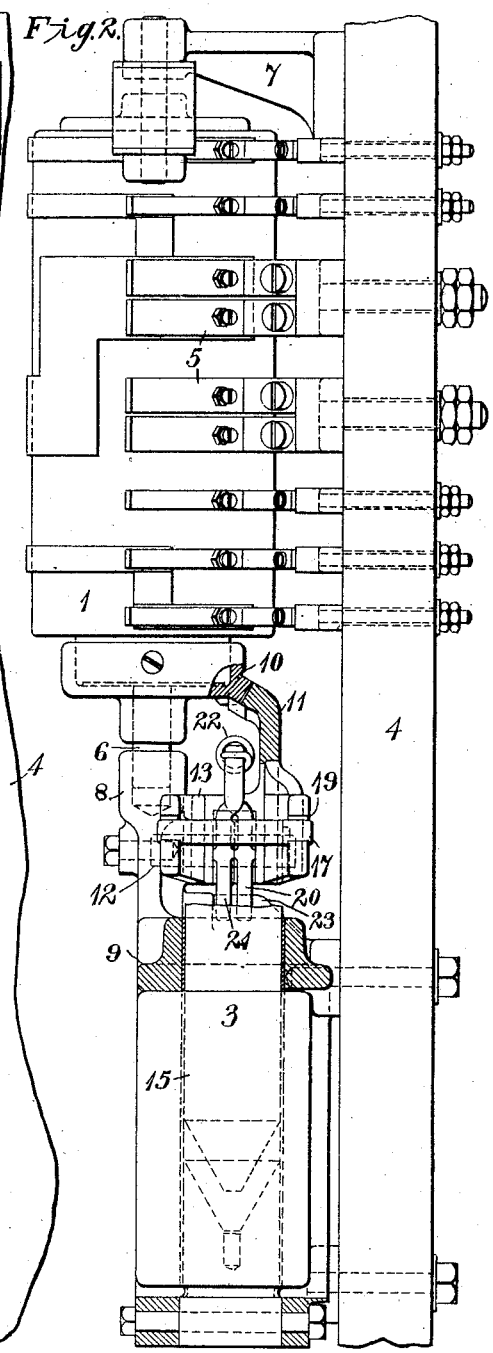
WITNESSES:
INVENTOR
William A. Paris
BY
ATTORNEY

UNITED STATES PATENT OFFICE.

WILLIAM A. PARIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRIC-CIRCUIT CONTROLLER.

No. 873,263.     Specification of Letters Patent.     Patented Dec. 10, 1907.

Application filed March 3, 1906. Serial No. 304,093.

*To all whom it may concern:*

Be it known that I, WILLIAM A. PARIS, a citizen of the United States, and a resident of Edgewood Park, in the county of Allegheny and State of Pennsylvania, have invented a new and useful Improvement in Electric-Circuit Controllers, of which the following is a specification.

My invention relates to controllers for electric circuits and has special reference to controllers for governing electric motors that are subjected to intermittent service and frequent reversals.

The object of my invention is to provide a controller of the drum type which shall be simple and durable in construction, electrically operated and adapted for switchboard mounting.

In the control of electric motors used for operating electric elevators and for other similar service in which the motors must be reversed at frequent intervals, it is often desirable to provide a controlling device which may be mounted upon a switchboard panel and be controlled electrically by means of a relatively small master switch located at a considerable distance from the controlling device. Such a controlling device may comprise a plurality of electrically operated switches for governing the motor circuits, but under some conditions, such as exist when two or more motors are to be controlled simultaneously, the required number of such switches may be so large as to make desirable the use of a controller having a rotatable, contact-carrying drum, the direction of rotation of which is reversed in order to reverse the motors. Under such conditions it is of special advantage to provide an electrically operated mechanism which is statically balanced, so that all available energy may be employed for rotating the drum.

The controller of my invention comprises a rotatably mounted contact-carrying drum which is driven by a gear connection, one member of which is attached to the drum and the other member of which is attached to a shaft that may be substantially perpendicular to the axis of the drum and be rotated through a suitable angle, in either direction, by the action of a pair of electro-magnets. The armatures of the actuating magnets may be pivotally connected to the extremities of a double forked lever which is integral with one of the gear members and may rotate about the aforesaid shaft, means being provided for returning the drum to its open-circuit position when the electro-magnets are deënergized.

My invention is illustrated in the accompanying drawings in which

Figure 1 is a front elevation, and Fig. 2 is a side elevation, partially in section, of a controlling device constructed in accordance with my invention.

Referring to the drawings, the controlling device illustrated therein comprises a rotatable, contact-carrying drum 1 and a pair of similar electro-magnets 2 and 3 which are mounted upon an insulating base or switchboard panel 4. The drum 1 is provided with contact ring segments to be engaged by a plurality of stationary contact fingers 5, and with a shaft 6, the upper end of which is journaled in a bearing bracket 7. The lower end of the shaft 6 is supported by a bearing 8 that may be integral with a frame 9 in which the electro-magnets 2 and 3 are mounted.

A bevel gear segment 10 is attached to the lower end of the drum 1 and is engaged by a bevel gear segment 11 with which a shaft 12, perpendicular to the drum shaft 6, is provided. The bevel gear segment 11 is provided with a forked lever 13, the extremities of which are pivotally connected to armatures 14 and 15 of the electro-magnets 2 and 3, the outer extremities of the armatures being provided with laterally-projecting pin shafts 16 and 17, the ends of which are engaged by slots or notches 18 and 19 in the forked extremities of the lever 13. The drum 1 is kept normally in open-circuit position by means of a pair of similar dogs 20 and 21, corresponding extremities of which are connected by a helical spring 22, while the two opposite extremities engage a central projection 23 on the frame 9. The dogs 20 and 21 are so mounted upon the shaft 12 that, as the shaft is rotated through a small angle in either direction by the action of the electro-magnets 2 and 3, the spring 22 is extended, and the drum is consequently returned to its normal open-circuit position as soon as the electro-magnets are deënergized. The arrangement of the parts is such that the controlling device is statically balanced, when the control drum occupies its open circuit position and consequently the force exerted by the electro-magnets is substantially all utilized in rotating the drum, which may be moved in either direction with equal facility.

The axis of the control drum, as illustrated, is parallel to the axes of the electro-magnets which are adapted to be located in a vertical plane, but this relation is not essential and it may be more desirable in some cases to mount the drum at right angles to the plane of the magnets, in which case spur gear segments would be substituted for the bevel gear segments shown.

A device constructed as hereinbefore described may be governed by any convenient selective switching device which completes circuit connections from a source of electrical energy through either of the electro-magnets 2 and 3.

Although I have shown a specific arrangement of details, my invention is not restricted thereto, and the rotatable, contact-carrying drum may be adapted for various types of electric motors, while the form, size and arrangement of the operating mechanism details may be varied within relatively wide limits.

I claim as my invention:

1. In a controller, the combination with a rotatable, contact-carrying member and coöperating contact fingers, of a pair of solenoids the axes of which are parallel to the axis of the rotatable member, cores for said solenoids, operating connections between said cores and said rotatable member, and means for automatically returning the drum to its off position when both solenoids are deënergized.

2. In a controller, the combination with a rotatable, contact-carrying member and coöperating contact fingers, of means for moving said rotatable member through a predetermined angle in either direction comprising a pair of similar electro-magnets having similar armatures mounted to operate in lines parallel to the axis of the rotatable member, a pivotally-mounted driving member connected to the outer extremities of the armatures and provided with a gear member and a coöperating gear member attached to one end of the contact-carrying member.

3. In a controller, the combination with a rotatable, contact-carrying member provided with a gear segment, and stationary contact fingers, of actuating means for said member comprising a pair of similar electro-magnets, armatures for said magnets the axes of which are substantially parallel to the axis of the rotatable member, and a second gear segment which engages the segment on the rotatable member and is connected to said magnet armatures.

4. In a controller, the combination with a rotatable, contact-carrying drum and stationary engaging contact fingers therefor, of means for rotating said drum through a predetermined arc in either direction, said means comprising a pair of similar electro-magnets and movable core members therefor, the axes of which are parallel to the axis of the drum, a lever pivotally mounted upon an axis that is perpendicular to that of the drum and connected, at its ends, to the movable core members, and a pair of complementary gear segments which are respectively attached to the rotatable drum and to the lever.

5. The combination with a base of insulating material, a pair of similar electro-magnets and cylindrical cores, the axes of which are parallel to each other and to said base, a rotatable, contact-carrying drum the axis of which is also parallel to the base, stationary engaging fingers, and a gear segment attached to one extremity of the drum, of a shaft perpendicular to the plane of the magnets, a complementary gear segment mounted upon said shaft to engage the gear segment which is attached to the drum and provided with projections that are so connected to the extremities of said cylindrical cores that motion of the cores produces a rotative movement of the drum, and means for automatically returning the drum to a predetermined position.

6. The combination with a rotatable, contact-carrying drum, of a pair of actuating electro-magnets therefor, and means for returning the drum to a predetermined position when the electro-magnets are deënergized, said means comprising a pair of pivoted dogs which engage a stationary projection at one side of the pivot and are connected together by a spring at the other side of the pivot.

7. The combination with a base of insulating material, a pair of similar electro-magnets and cylindrical core members therefor having axes which are parallel to each other and to said base, a rotatable, contact-carrying drum, stationary engaging fingers for said drum which are mounted upon said base, and a gear segment attached to one extremity of the drum, of a stationary shaft perpendicular to the base, a complementary gear segment rotatably mounted upon said shaft to engage the gear segment which is attached to the drum, forked projections integral with the complementary gear segment and so connected to the extremities of the core members that movement thereof produces rotative movement of the drum, and means for automatically returning the drum to a predetermined position, said means comprising a pair of dogs mounted on said shaft and a spring connecting their ends together at one side of the shaft.

In testimony whereof, I have hereunto subscribed my name this 28th day of February, 1906.

WILLIAM A. PARIS.

Witnesses:
HENRY D. JAMES,
BIRNEY HINES.